Patented June 24, 1930

1,766,951

UNITED STATES PATENT OFFICE

KENNETH HERBERT SAUNDERS, OF MANCHESTER, ENGLAND, ASSIGNOR TO BRITISH DYESTUFFS CORPORATION LIMITED, OF MANCHESTER, ENGLAND

INTERMEDIATE DERIVED FROM AMINOSULPHONES

No Drawing. Application filed August 31, 1928, Serial No. 303,371, and in Great Britain October 21, 1924.

In my application Serial No. 53404, filed Aug. 29, 1925, whereof the present application is a continuation in part, I have described a new series of azo and poly-azo dyestuffs and a process of manufacture of these new dyestuffs.

The present application relates to such amino sulphones as are used in said acknowledged application, Ser. No. 53,404 as intermediates and to the processes of making such amino sulphones. The present process comprises condensing a sulphinic acid derivative of a benzene ortho hydroxy carboxylic acid with an aromatic nitro compound containing a labile halogen atom, to form a nitro diaryl sulphone, and then reducing the said nitro diaryl sulphone to convert at least one nitro group into an amino group and thereby produce the new amino sulphone. It is also within the scope of my invention to reduce all the nitro groups to amino groups.

The nitro sulphones produced by the condensation reaction have the probable formula

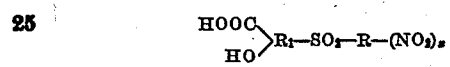

wherein $R_1$ represents a benzene residue and R represents a benzene or naphthalene residue both of which may be further substituted and $x$ represents 1 or 2, and in which the —OH and —COOH groups are ortho to each other. Nitro sulphones of this type upon reduction yield mono- or diamino sulphones according to the number of nitro groups present. Both the mono- and the diamino sulphones are useful in the manufacture of dyestuffs remaining substantially unchanged in shade during mordant dyeing. In another and copending application, Ser. No. 398,805, I have described and claimed mono-amino sulphones while in the present application I claim specifically diamino sulphones.

Typical mono and diamino sulphones described in acknowledged application, Ser. No. 53,404 may be represented by the probable structures:

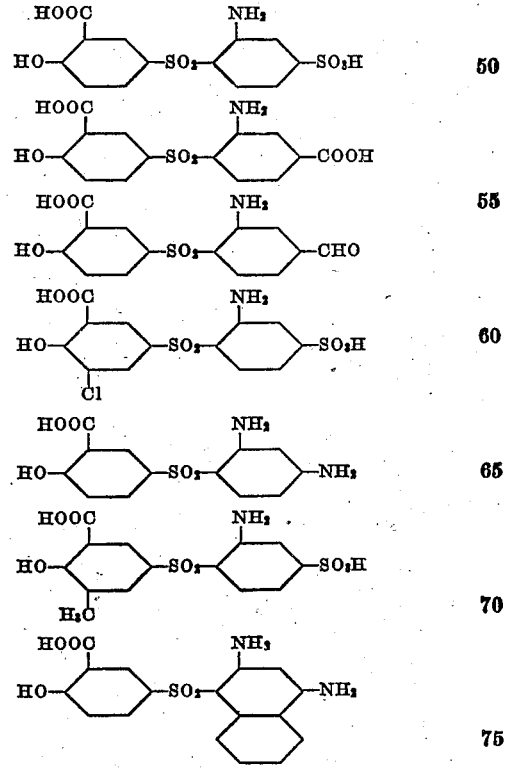

The mordant-fixing portion of the compound molecule usually carries hydroxyl and carboxyl. I regard it as advantageous to have the hydroxyl and carboxyl in ortho position to each other in the aryl group in which they occur.

My new amino sulphones have the probable formula

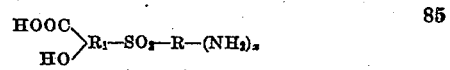

wherein $R_1$ represents a benzene residue and R represents a benzene or naphthalene residue both of which may be further substituted and $x$ represents 1 or 2, and in which the —OH and —COOH groups are ortho to each other. These intermediates may be regarded as mixed sulphones carrying two different aryl groups, one of which contains one or more $NH_2$ groups while the other does not but carries a chrome-fixing group.

Other generic formulæ which can be used to represent part or all of the amino-sulphones of my invention are:

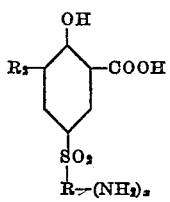

wherein $R_2$ represents hydrogen or a substituent group such as —Cl, or —$CH_3$, $x$ represents 1 or 2 and R represents an aromatic residue which may be further substituted; and:

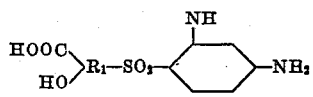

wherein $R_1$ represents a benzene residue which may be further substituted, and in which the —OH and —COOH groups are ortho to each other.

The intermediates may be converted into azo dyes by so altering the aryl group containing the amino group or groups as to convert it into a chromophore. Various typical examples of processes for so converting these intermediates into azo dyestuffs are disclosed in my prior acknowledged application, Ser. No. 53,404. From my new intermediates there may be produced new azo dyes which are characterized by having the chromophoric or color giving portion of the molecule screened from the mordanting portion or the portion carrying a chelate group of the molecule by a sulphone bridge, so that fixation of the dye by the mordant takes place without great change in shade on dyeing.

For instance, the —$NH_2$ group may be diazotized in any of the usual ways and coupled with a second component. Any amino, hydroxy, or amino-hydroxy compound capable of coupling may be used as the second component, the choice being determined by the shade or properties (e. g. solubility, fastness to chlorine, etc.) of the required dyestuffs. Disazo or polyazo dyestuffs may be built up if desired. In the following examples I have set forth in some detail certain methods of making intermediates within the scope of the present invention.

*Example 1.*—10 parts of salicylic sulphinic acid, 13 parts of the sodium salt of 4-chloro-3-nitrobenzenesulphonic acid, 5.3 parts of sodium carbonate, and 25 parts of water are boiled together for some hours, the solution becoming deep orange as combination proceeds. The sulphone which has been produced may be isolated either by acidifying the hot solution or by forming the barium salt and evaporating to crystallization when a pale yellow granular substance, readily soluble in warm water, is obtained.

*Example 2.*—42.5 parts of the sodium salt of the nitro sulphone obtained in Example 1 are dissolved in 150 parts of water and gradually added at 95° C. with good stirring to a suspension (previously etched by boiling for 5 minutes) of 17 parts of fine iron filings in 25 parts of water containing 0.1 parts of hydrochloric acid. When all the nitro sulphone solution has been added reduction is allowed to proceed for 3 hours at 95–100° C. Sufficient strong caustic liquor is then added to make the mixture definitely caustic and after boiling for a short time the precipitated iron oxide is filtered off. The amino sulphone—in practically pure white condition—is precipitated by treatment of the cooled filtrate with mineral acid.

2-amino-4'-hydroxy-3'-carboxy-diphenyl-sulphone-4-sulphonic acid is fairly soluble in water and easily soluble in alkalies. In solution it gives a bluish red colouration with dilute aqueous ferric chloride. When treated with nitrous acid in the usual manner it forms a sparingly soluble light yellow diazo compound which couples very rapidly with the usual coupling components to form azo dyestuffs.

The nitrosulphone may be chlorinated before reduction by the action of a hypochlorite of an alkali metal in the well known manner. It is to be supposed that chlorination occurs in the vacant position to the ortho hydroxy group.

*Example 3.*—If in Example 1 the 10 parts of 5-sulphino salicylic acid are replaced by 10.8 parts of 5-sulphino-3-methyl-2-hydroxy-benzene carboxylic acid (obtained, for example, by reduction by means of zinc dust in alcohol of the sulphonylchloride derived from o-cresotinic acid) the condensation results in the formation of a higher homologue of the nitrosulphone obtained in Example 1.

*Example 4.*—The nitro sulphone obtained in Example 3 may be reduced to the corresponding amino sulphone according to the method outlined in Example 2. The equivalent amount of its sodium salt (43.9 parts) dissolved in 150 parts of water are used. This amino sulphone is very similar in its characteristics to that obtained in Example 2.

*Example 5.*—10 parts of 5-sulphino-3-methyl-2-hydroxy-benzene carboxylic acid are added to a boiling alcoholic solution of 9.35 parts of 2.4-dinitrochlorobenzene and 4.6 parts of potassium acetate. From the solution which is clear at first a copious white precipitate soon separates and after boiling for some time and cooling, this is filtered off. The dinitrosulphone may be purified by dissolving in alkali and reprecipitating with acid.

*Example 6.*—The dinitrosulphone obtained as in Example 5 is best reduced by means of stannous chloride in presence of hydrochloric acid as follows:—

38.2 parts of the dinitrosulphone are made into neutral solution by means of 5.3 parts of soda ash in 200 parts of water. The clear dark yellow solution so obtained is added gradually at the boil with vigorous agitation to a solution of 114 parts of stannous chloride and 22 parts of hydrochloric acid in 300 parts of water. When addition of the dinitro sulphone liquor is complete, reduction, under boiling, using a reflux condenser, is carried on for a further three hours. In the course of the reduction a copious yellow precipitate of the double tin salt of the diamine is thrown down. The hot reduction product is then cautiously added to a boiling concentrated solution of sodium carbonate (120 parts) whereby the tin is precipitated by the carbonate. The reaction of the mixture after adding the reduction product should be alkaline to test paper. The precipitated tin compound is filtered off at the boil and on concentrating and cooling, the pale straw coloured filtrate, the sodium salt of 5'-methyl-4'-hydroxy-2:4-diamino diphenylsulphone-3'-carboxylic acid is deposited as a white crystalline mass.

This diaminosulphone does not tetrazotize normally on treatment with nitrous acid in the usual manner. Such treatment results in the formation of dyestuffs of—probably—the type of Bismarck brown. It readily couples with diazo compounds to yield azo dyestuffs.

It may be mono acylated,—presumable the 4-amino group being attached,—and in this condition yields sparingly soluble diazo derivatives with nitrous acid which couple readily with the usual coupling components.

The mono-amino sulphones of this invention occur as well defined colourless crystalline substances when obtained by crystallizing the alkali metal salts from water. They give a red colouration with dilute aqueous ferric chloride solution and their diazo compounds are usually of a pale yellow colour sparingly soluble in water.

The diamino sulphones give red colouration with dilute aqueous ferric chloride solution and exhibit all the general properties of diamines of the benzene series.

What I claim is:—

1. The step in the production of new intermediates for dyes which consists in condensing a 5-sulphino salicylic acid with an aromatic nitro compound containing a labile halogen atom.

2. The process for the manufacture of new intermediates for dyes which comprises condensing the sulphinic acid derivative of a benzene o-hydroxycarboxylic acid with a reactant selected from a group consisting of benzene and naphthalene nitro compounds which contain a labile halogen atom, and reducing at least one nitro group in the nitrosulphone so produced.

3. As new compositions of matter, amino derivatives of diaromatic sulphones, one aromatic group being a benzene residue carrying hydroxyl and carboxylic groups which are ortho to each other and the second aromatic group being a residue selected from a class consisting of benzene and naphthalene amino compounds, the said amino derivatives being well-defined, colorless crystalline substances, fairly soluble in water and easily soluble in alkalies, dissolving in dilute aqueous ferric chloride with a red coloration and giving, when treated with nitrous acid sparingly soluble pale yellow diazo compounds, which couple very rapidly with the usual coupling components to form chromable azo dyes.

4. As new compositions of matter, diamino derivatives of diaromatic sulphones, one aromatic group being a benzene residue carrying hydroxyl and carboxylic groups which are ortho to each other and the second aromatic group being a residue selected from a class consisting of benzene and naphthalene amino compounds, the said diamino derivatives being soluble in water, the solution becoming red on addition of a little ferric chloride solution; and showing all the general chemical properties of diamines of the benzene series.

5. As new compositions of matter, amino diaromatic sulphones having the probable formula

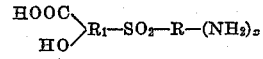

wherein $R_1$ represents a benzene residue and R represents a benzene or naphthalene residue both of which may be further substituted, and $x$ represents 1 or 2, and in which the OH and COOH groups are ortho to each other.

6. As new compositions of matter, amino diaromatic sulphones having the probable formula

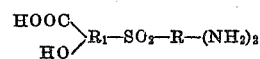

wherein $R_1$ represents a benzene residue and R represents a benzene or naphthalene residue both of which may be further substituted, and in which the OH and COOH groups are ortho to each other.

7. As a new composition of matter a diamino diphenyl sulphone having the probable formula

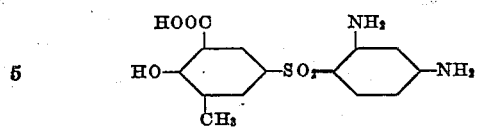

the said diamino sulphone in the form of its sodium salt being a white crystalline mass.

8. As new dyestuff intermediates, amino sulphones having the probable structural formula.

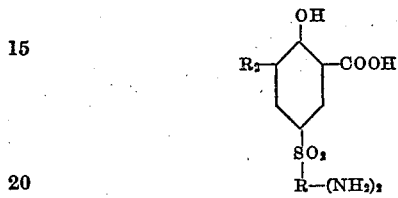

wherein $R_2$ represents —H, —Cl or —CH$_3$ and R is an aromatic residue which may be further substituted.

9. As new compositions of matter the diamino diphenyl sulphones having the probable formula

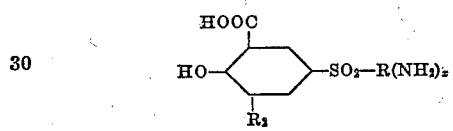

wherein $R_2$ represents a substituent group, $x$ represents 1 or 2 and R represents an aromatic residue which may be further substituted.

10. As new compositions of matter the diamino diphenyl sulphones having the probable formula

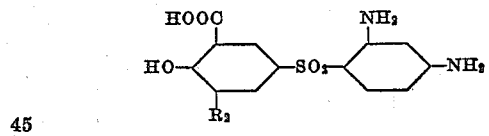

wherein $R_2$ represents a substituent group, the said sulphones in the form of their sodium salts being white crystalline masses.

11. As new compositions of matter the diamino diphenyl sulphones having the probable formula

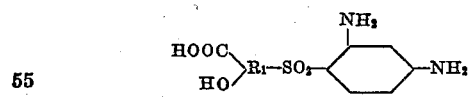

wherein $R_1$ represents a benzene residue which may be further substituted and in which the —OH and —COOH groups are ortho to each other.

12. As new compositions of matter, two aromatic groups linked by the radical —SO$_2$—, one of said aromatic groups being a benzene residue carrying ortho hydroxyl and carboxylic groups and the second of said aromatic groups being a residue selected from a class consisting of benzene and naphthalene amino compounds.

In witness whereof I affix my signature.
KENNETH HERBERT SAUNDERS.